United States Patent
Michal et al.

(10) Patent No.: US 10,647,288 B2
(45) Date of Patent: May 12, 2020

(54) BELT TIGHTENER

(71) Applicant: TRW AUTOMOTIVE GMBH, Alfdorf (DE)

(72) Inventors: Kacprzak Michal, Czestochowa (PL); Seitzer Dominik, Waldstetten (DE); Betz Hans-Peter, Böbingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 144 days.

(21) Appl. No.: 15/753,983

(22) PCT Filed: Jul. 22, 2016

(86) PCT No.: PCT/EP2016/067537
§ 371 (c)(1),
(2) Date: Feb. 21, 2018

(87) PCT Pub. No.: WO2017/032523
PCT Pub. Date: Mar. 2, 2017

(65) Prior Publication Data
US 2018/0244235 A1     Aug. 30, 2018

(30) Foreign Application Priority Data
Aug. 21, 2015   (DE) .................. 10 2015 010 807

(51) Int. Cl.
*B60R 22/195*  (2006.01)
*F15B 15/19*   (2006.01)
*B60R 22/46*   (2006.01)

(52) U.S. Cl.
CPC ...... *B60R 22/1953* (2013.01); *B60R 22/1952* (2013.01); *B60R 22/1955* (2013.01); *B60R 22/4619* (2013.01); *F15B 15/19* (2013.01)

(58) Field of Classification Search
CPC ............ B60R 22/1953; B60R 22/1952; B60R 22/4619; B60R 22/1955; F15B 15/19
See application file for complete search history.

(56) References Cited

U.S. PATENT DOCUMENTS 5,207,618 A * 5/1993 Nishizawa .......... B60R 22/1953
                                                                280/806
5,468,019 A * 11/1995 Blase .................. B60R 22/4619
                                                                280/805

(Continued)

FOREIGN PATENT DOCUMENTS

DE       1076455       3/1955
DE    102008031799    1/2010
(Continued)

*Primary Examiner* — Karen Beck
(74) *Attorney, Agent, or Firm* — Tarolli, Sundheim, Covell & Tummino LLP

(57) ABSTRACT

The invention relates to a belt tensioner (30) for a vehicle occupant restraint system comprising a housing (32), a working chamber (34) into which the compressed gas released in the case of restraint is flowing, a pull rope (24) extending through an opening (36) within the housing (32) and a sealing bush (10) for sealing the working chamber (34) against the opening (36) between the pull rope (24) and the housing (32), with the sealing bush (10) comprising a sleeve (16) and a sealing element (12) and the sealing bush (10) being pressed onto the pull rope (24) by plastic deforming of the outer sleeve (16).

11 Claims, 2 Drawing Sheets

(56) References Cited

U.S. PATENT DOCUMENTS

| | | | |
|---|---|---|---|
| 5,897,140 A | 4/1999 | Wier | |
| 6,250,682 B1 * | 6/2001 | Betz | B60R 22/1952 280/806 |
| 6,250,683 B1 * | 6/2001 | Betz | B60R 22/1952 280/806 |
| 6,299,211 B1 * | 10/2001 | Wier | B60R 22/1952 280/741 |
| 7,398,998 B2 * | 7/2008 | Arnold | B60R 22/1952 280/801.1 |

FOREIGN PATENT DOCUMENTS

| | | |
|---|---|---|
| DE | 102013007912 | 11/2014 |
| FR | 935085 | 10/1946 |
| WO | 9834817 | 8/1998 |

* cited by examiner

BELT TIGHTENER

RELATED APPLICATIONS

This application corresponds to PCT/EP2016/067537, filed Jul. 22, 2016, which claims the benefit of German Application No. 10 2015 010 807.7, filed Aug. 21, 2015, the subject matter of which are incorporated herein by reference in their entirety.

BACKGROUND OF THE INVENTION

The invention relates to a belt tensioner for a vehicle occupant restraint system comprising a housing, a working chamber into which the compressed gas being released in the case of restraint is flowing, a pull rope extending through an opening within the housing and a sealing bush for sealing the working chamber against the opening between the pull rope and the housing.

Belt tensioners comprising a pull rope as tension transmission means are known. The high requirements made to the tightness between the pull rope and the housing to ensure reliable functioning in the case of restraint can only be achieved by covering the pull rope or by a sleeve system.

When directly sealing the pull rope by a soft sealing element it is hardly possible to bring assembly-optimized dimensions of the sealing element in line with the dimensions required for high requirements to tightness. On the other side, sealing elements having diameters required for proper sealing in the threading procedure can be mounted with considerable effort only.

SUMMARY OF THE INVENTION

It is the object of the invention to provide a belt tensioner including a pull rope having a sealing system which meets high requirements to tightness and at the same time can be easily assembled.

For achieving the object a belt tensioner for a vehicle occupant restraint system is provided comprising a housing, a working chamber into which the compressed gas being released in the case of restraint is flowing, a pull rope extending through an opening within the housing and a sealing bush for sealing the working chamber against the opening between the pull rope and the housing, wherein the sealing bush comprises an outer sleeve and an inner sealing element, with the sealing bush being pressed onto the pull rope by plastically deforming the outer sleeve. The sealing bush in the non-deformed state, i.e. in its as-delivered state, has dimensions facilitating easy assembly, for example by threading, on the pull rope. After this operation the outer sleeve of the sealing bush is plastically deformed so as to obtain the required tightness between the pull rope and the sealing bush. Said plastic deforming may be carried out especially by crimping or pressing by a tool, for example calipers or a press. After reforming, the outer dimensions of the sealing bush correspond to the required mounting dimensions of the housing so that the sealing bush now can be inserted into the housing. In this way, few simple steps are necessary to quickly mount the housing of the belt tensioner onto the pull rope and to ensure high tightness.

Preferably, the sleeve is made from steel having advantageous properties in forming and being adapted to apply high force especially to the sealing element softer as compared to the sleeve so as to ensure high tightness and safe mount.

The sealing element may be made from elastomer or soft metal.

According to a preferred embodiment, the sealing element has an axial length at least equal to that of the sleeve. In this way, the sealing element includes, axially at the sleeve, a projection of preferably few millimeters which may be adjacent to the housing and may act there as a sealing element.

It is of advantage when the sealing element in the non-deformed state has an inner diameter which is at least as large as the largest diameter of the pull rope. In this manner, the sealing bush can be easily mounted with the sealing element as the frictional resistance is reduced during threading, for instance.

The sealing element preferably includes at least one radially outer sealing lip which serves for sealing the working chamber in the radial direction of the pull rope and in the axial direction projects from the sleeve. The outer diameter of the sealing element is at least as large as the outer diameter of the sleeve in the non-deformed state. Thus, the sealing bush has a sealing portion at the sealing element which seals the opening around the pull rope in the radial direction toward the housing and hence increases the tightness.

Preferably, the sealing element includes at least one axial sealing lip which serves for sealing the working chamber in the axial direction of the pull rope and in the axial direction projects from the sleeve. This type of sealing is especially favorable as, in the case of restraint, the sealing element is pressed against the housing by the high pressure within the working chamber and thus entails improved tightness.

According to a preferred embodiment, the outer radial sealing lip and the axial sealing lip are arranged on opposite ends of the sealing bush. In this way, by deforming a sealing lip in the case of restraint the function of the respective other sealing lip is not impaired and the sealing bush has two sealing lips independent of each other which increase the tightness and thus the functional safety of the belt tensioner.

According to another preferred embodiment, the sealing element includes at least one cable sealing lip whose inner diameter is smaller than the inner diameter of the sealing element distant from the cable sealing lip in the non-deformed state. Consequently, the sealing lip projects radially inwardly and presses against the pull rope. The cable sealing lip in this way protruding into the through hole of the sealing element prevents the sealing bush from getting out of place during assembly after said sealing bush has been slipped onto the pull rope and before it is deformed. This prevents the sealing bush from getting lost and facilitates more accurate positioning of the sealing bush on the pull rope.

The cable sealing lip may be arranged at an axial end of the sealing element, especially at the end of the outer radial sealing lip so as to facilitate manufacture as well as quality control of the sealing element.

It is advantageous when the pull rope is a steel rope. Thus, it is ensured that the function of the pull rope is not impaired by the high temperatures and the forces acting during the case of restraint.

BRIEF DESCRIPTION OF THE DRAWINGS

Further advantages and features will be evident from the following description in connection with the enclosed drawings, wherein.

DESCRIPTION

Figure 1:
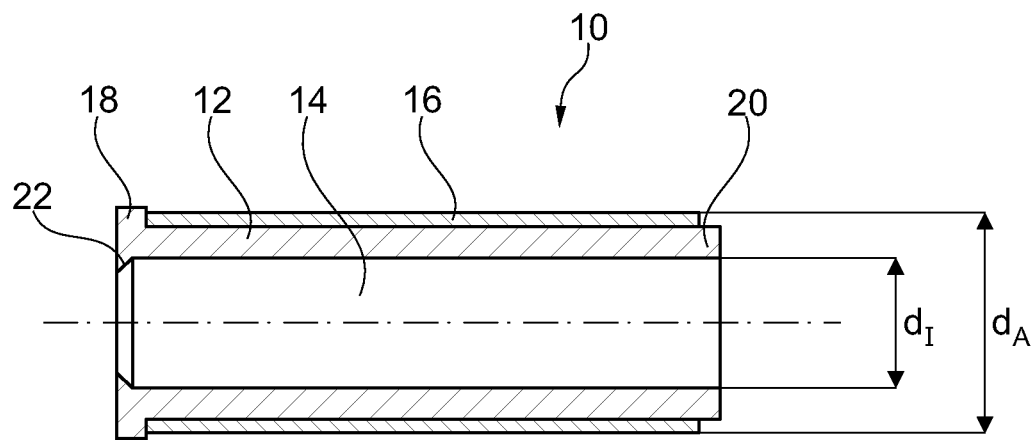
FIG. 1 shows in a sectional view a sealing bush for a belt tensioner according to the invention.

FIG. 1 shows a cylindrical multi-part sealing bush 10 which includes a radially inner circular-cylindrical sealing element 12 having an axial through-hole 14 surrounded at its radially outer circular-cylindrical cover surface by a sleeve 16 made from steel.

The sealing element 12 is longer in the axial direction than the sleeve 16 so that the sealing element 12 includes an axial projection on both sides of the sleeve 16.

The sealing element 12 is made from elastomer or a metal which is softer as compared to steel.

At an axial end of the sealing bush 10 the sealing element 12 includes a radially outer sealing lip 18 in the form of a collar projecting in the axial direction from the sleeve 16 and having an outer diameter which is at least as large as the outer diameter $d_A$ of the sleeve 16 and preferably larger than $d_A$.

On the side opposed to the end including the sealing lip 18, the sealing element 12 has an axial sealing lip 20 which is formed by the portion projecting from the sleeve 16 in the axial direction.

At the axial end where the radially outer sealing lip 18 is provided, the sealing element 12 includes a cable sealing lip 22 which protrudes radially inwardly into the axial through-hole 14 and whose diameter is smaller than the inner diameter $d_I$ of the sealing element 12 distant from the cable sealing lip 22.

The sealing bush 10 may be manufactured as two-component part for example by injection-molding or may consist of two separate elements as a subassembly.

Figure 2:
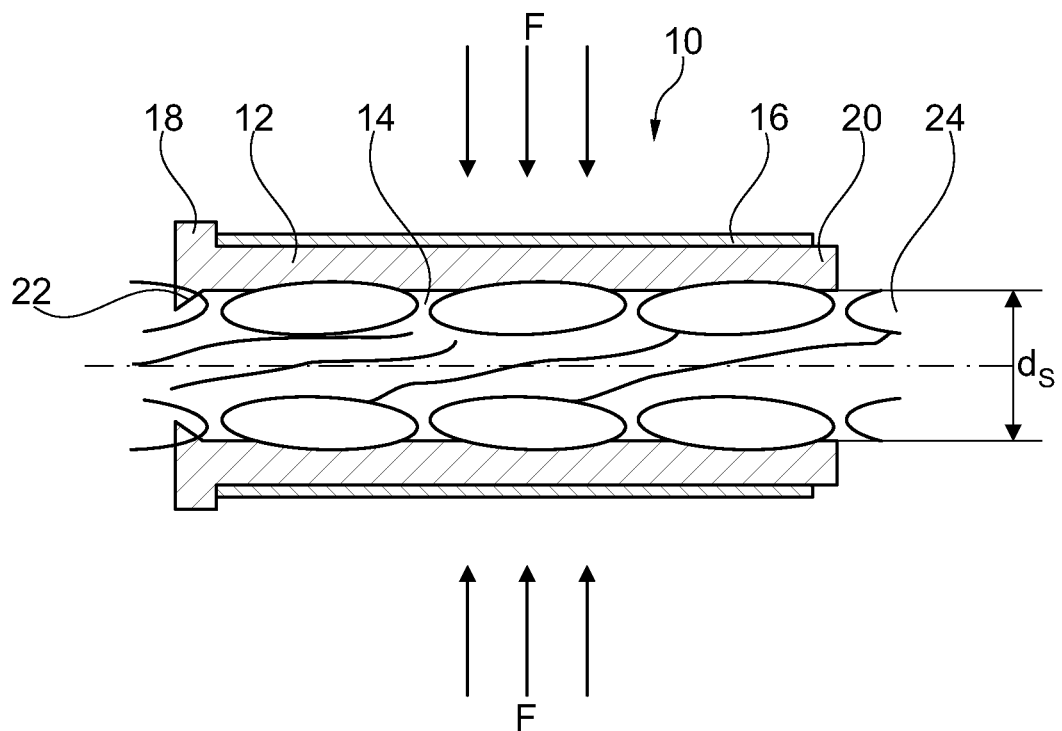
FIG. 2 shows in a sectional view a sealing bush for a belt tensioner according to the invention which is arranged on a pull rope.

FIG. 2 illustrates the sealing bush 10 fastened on the pull rope 24 in the form of a steel rope in this case.

In order to fasten the sealing bush 10 on the pull rope 24, the pull rope 24 is threaded through the through-hole 14, with the inner diameter $d_I$ of the sealing element 12 being at least as large as the largest diameter $d_S$ of the pull rope 24.

After having positioned the sealing bush 10, the sleeve 16 disposed externally around the sealing element 21 is plastically deformed by a force F. This permanent reforming of the sleeve 16 helps pressing the softer more elastic sealing element 12 against the pull rope 24 which is not smooth at the outer periphery and thus the sealing bush 10 is fastened on the pull rope 24. The sealing element 12 is pressed into recesses at the outer periphery of the pull rope 24.

Figure 3:
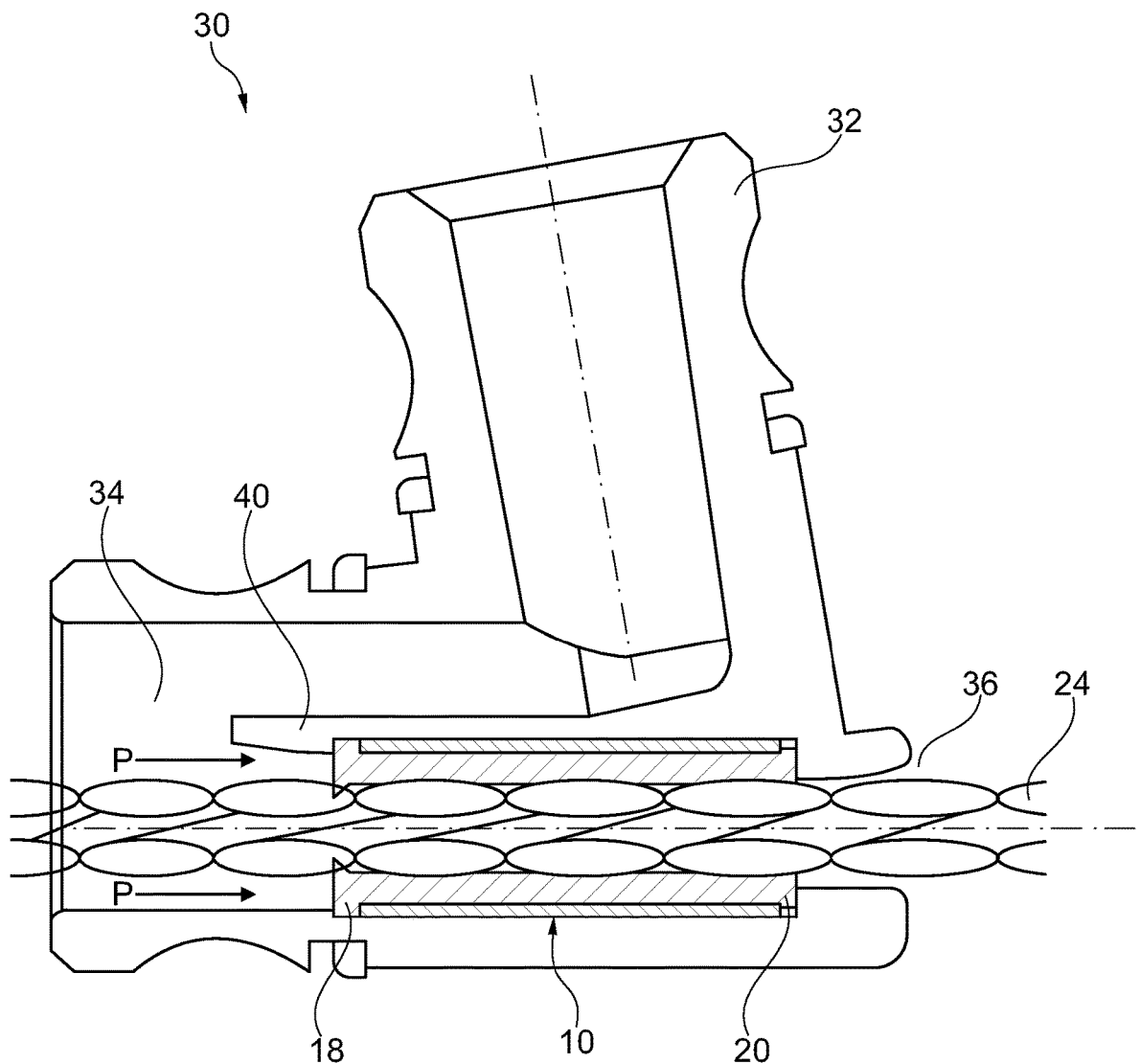
FIG. 3 shows in a sectional view a belt tensioner according to the invention comprising a housing and a sealing bush according to FIG. 1 pressed onto the pull rope.

In FIG. 3, a belt tensioner 30 for a vehicle occupant restraint system is shown which is fastened on the pull rope 24 via the sealing bush 10. The belt tensioner 30 comprises a housing 32, a working chamber 34 into which the released compressed gas is flowing in the case of restraint and is acting on the sealing bush 10 by a pressure p, as well as an opening 36 through which the pull rope 24 is guided out of the housing 32. The pull rope is moved to the left in the case of restraint according to FIG. 3. The sealing bush is maintained in position within the housing 32 by contacting the shoulder shown in FIG. 3 on the right-hand side of the sealing bush.

The sealing bush 10 serves not only for fastening but also for sealing the working chamber 34 against the opening 36 between the pull rope 24 and the housing 32.

In the axial direction, the axial sealing lip 20 of the sealing bush 10 seals the working chamber 34 against the wall of the guide 40 of the housing 32 delimiting the opening 36.

In the radial direction, the opening 36 is sealed by the radial sealing lip 18 of the sealing bush 10.

The safe position of the sealing bush 10 within the housing 32 may be secured via the system pressure and an appropriate contact surface of the sealing bush 10 on the housing 32.

Alternatively, the sealing bush 10 may also be additionally secured via clamping elements and/or gluing procedures.

The invention claimed is:

1. A belt tensioner (30) for a vehicle occupant restraint system comprising a housing (32), a working chamber (34) into which compressed gas released in a case of restraint is flowing, a pull rope (24) extending through an opening (36) within the housing (32) and a sealing bush (10) for sealing the working chamber (34) against the opening (36) between the pull rope (24) and the housing (32), wherein the sealing bush (10) comprises an outer sleeve (16) and an inner sealing element (12), with the sealing bush (10) being pressed onto the pull rope (24) by plastic deforming of the outer sleeve (16), and wherein the sealing bush (10) is maintained in a fixed position within the housing (32) by contacting a shoulder of the housing on one side of the sealing bush (10).

2. The belt tensioner according to claim 1, wherein the sleeve (16) is made from steel.

3. The belt tensioner according to claim 1, wherein an axial length of the inner sealing element (12) is at least equal to that of the sleeve (16).

4. The belt tensioner according to claim 1, wherein the inner sealing element (12) in a non-deformed state has an inner diameter ($d_I$) which is at least as large as a largest diameter ($d_S$) of the pull rope (24).

5. The belt tensioner according to claim 1, wherein the inner sealing element (12) includes at least one radially outer sealing lip (18) which serves for sealing the working chamber (34) in a radial direction of the pull rope (24) and in an axial direction projects from the sleeve (16), and has an outer diameter which is at least as large as an outer diameter ($d_A$) of the sleeve (16) in a non-deformed state.

6. The belt tensioner according to claim 1, wherein the inner sealing element (12) includes at least one axial sealing lip (20) which serves for sealing the working chamber (34) in an axial direction of the pull rope (24) and projects from the sleeve (16) in the axial direction.

7. The belt tensioner according to claim 6, wherein at least one radially outer sealing lip (18) and the axial sealing lip (20) are arranged on opposite axial ends of the sealing bush (10), the at least one radially outer sealing lip (18) for sealing the working chamber (34) in a radial direction of the pull rope (24), the at least one radially outer sealing lip (18) projecting from the sleeve (16) in the axial direction, the at least one radially outer sealing lip (18) having an outer diameter which is at least as large as an outer diameter ($d_A$) of the sleeve (16) in a non-deformed state.

8. The belt tensioner according to claim 1, wherein the inner sealing element (12) includes at least one cable sealing lip (22) whose inner diameter is smaller than an inner diameter ($d_I$) of the inner sealing element (12) distant from the cable sealing lip (22) in a non-deformed state.

9. The belt tensioner according to claim 8, wherein the cable sealing lip (22) is disposed at an axial end of the inner sealing element (12).

10. The belt tensioner according to claim 1, wherein the pull rope (24) is a steel rope.

11. The belt tensioner according to claim 9, wherein the inner sealing element (12) includes at least one radially outer sealing lip (18) which serves for sealing the working chamber (34) in a radial direction of the pull rope (24) and in an axial direction projects from the sleeve (16), the at least one radially outer sealing lip (18) having an outer diameter which is at least as large as an outer diameter ($d_A$) of the sleeve (16) in the non-deformed state, the at least one radially outer sealing lip (18) being disposed at the same axial end of the inner sealing element (12) as the cable sealing lip (22).

* * * * *